United States Patent
Hontschik et al.

[11] 3,975,037
[45] Aug. 17, 1976

[54] AUTOMOTIVE SAFETY DEVICE

[76] Inventors: Heinrich Hontschik, Mullerstr. 25, Frankfurt am Main; Ingobert Schmid, Im Kleinen Grund 15, 6241 Rossert; Peter Greiner, Bonameser Str. 51, 6 Frankfurt am Main 50, all of Germany

[22] Filed: Dec. 10, 1973

[21] Appl. No.: 423,148

[30] Foreign Application Priority Data
Dec. 9, 1972   Germany............................ 22603663

[52] U.S. Cl. .............................. 280/733; 280/751; 280/746; 297/390
[51] Int. Cl.² .......................................... B60R 21/10
[58] Field of Search ............. 280/150 AB, 150 SB, 280/150 B; 180/82 C; 297/385, 388, 390

[56] References Cited
UNITED STATES PATENTS

| | | | |
|---|---|---|---|
| 3,232,665 | 2/1966 | Von Wimmersperg | 297/390 X |
| 3,706,463 | 12/1972 | Lipkin | 280/150 AB |
| 3,784,224 | 1/1974 | Peeler | 280/150 B |

FOREIGN PATENTS OR APPLICATIONS

| | | | |
|---|---|---|---|
| 2,116,094 | 10/1972 | Germany | 280/150 AB |

*Primary Examiner*—Kenneth H. Betts
*Assistant Examiner*—Michael J. Forman
*Attorney, Agent, or Firm*—Ernest F. Marmorek

[57] ABSTRACT

A safety device for motor vehicle seats, particularly for the protection of a child in the event of rapid deceleration, has a retaining belt, a deformable air bag, and belt loops arranged on the belt which hold and guide the air bag, so that at rapid deceleration the body of the child will exert forward pressure on the air cushion towards the front portion of the belt, and thereby the air bag will be deformed and will be raised in front of the body of the child to be protected.

5 Claims, 7 Drawing Figures

AUTOMOTIVE SAFETY DEVICE

The invention relates to a safety device which is particularly foreseen for the protection of children and of youths in cases of impact or great deceleration of the motor vehicle, with said safety device consisting in essence of a retaining belt and of a more or less deformable air cushion. The retaining belt is constructed thereby in accordance with the type of a conventional pelvis - retaining belt and is anchored in the motor vehicle.

Known safety devices for children either consist of a scaled-down seat or of a structure put on top of the seat, in which the child can be "tied in" with retaining belts in similar manner as a grown up person. However, the remaining slight freedom of movement affects a child much more than a grown-up person.

Furthermore, cushioned plastic shells which are arranged in front of the child are known as safety devices in motor vehicles. Such shells are likewise disturbing especially for the reason that for the attainment of an effective protection, they must be attached at as small a distance from the child as possible.

Furthermore, for the protection of the occupants in motor vehicles, air bags are in the state of development which, in folded state, are housed in the motor vehicle and in case of need are automatically inflated from gas cylinders, with the aid of propulsive charges or the like, whereby the inflation mechanism is released through switches which respond to great decelerations. Problems which are related to such expensive air bag devices have in no ways been solved yet in a satisfactory manner.

It is therefore the task of the invention to develop a safety device which restricts the person to be protected as little as possible and especially is also suited for children and youths.

It has been shown, that this task can be solved by means of a safety device which, in essence, consists of a retaining belt and air cushions, whereby said safety device is characterized in that, in normal sitting position, the air cushions are arranged approximately at the height of the hips in front of the occupants and, with the aid of belt loops, are held and guided in such a manner in this position by the retaining belt, that the air cushions deform themselves at great deceleration of the motor vehicle and raise themselves in front of the body of the person to be protected, whereby the deformation of the air cushions is brought about through the pressure of the body on the air cushions and on the retaining belt.

In the case of the safety device designed according to the present invention, the air cushion which is arranged in front of the child and is attached to the retaining belt, serves in the normal sitting position as table or as supporting surface for playing, reading or the like. Although the person to be protected has to remain seated, he can move his arms in a completely unrestricted manner; the view out of the window remains likewise unobstructed.

On impact of the motor vehicle, the child or the youth is gathered in the raised and, in a few instances, volume-wise considerably enlarged cushions.

According to one advantageous embodiment of the present invention, the air cushions, in normal sitting position, are arranged horizontally in front of the person to be protected and are guided in such a manner by the retaining belt that, on impact or at great deceleration of the motor vehicle, they fold out in upward direction in front of the body of the seated person.

On the other hand, it has also been foreseen on the basis of the present invention to utilize air cushions which are provided with releasing seams which, in turn, rip open when high pressure is exerted on the cushion, through which the volume of the cushion increases and the cushion expands in upward direction. In place of the releasing seams, also unfilled, folded-up additional cushions can be attached at the upper side of the air cushions, which are connected via bursting diaphragms with the cushions. On impact, these additional cushions fill up.

According to still another embodiment of the present invention, the air cushions are constructed in an inflatable and upwardly expandable manner, whereby the inflation mechanism, for example a gas cylinder or a gas generator, is released at great deceleration of the motor vehicle by the tensile stress of the retaining belt.

Further characteristics, advantages and applicabilities of the present invention are apparent from the following representation of exemplified embodiments of the present invention, as well as from the attached illustrations.

In schematic representation

Figure 3A:
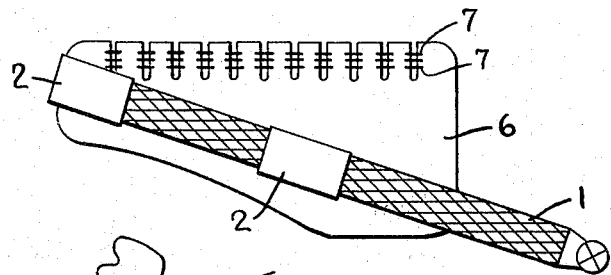
Figure 3B:
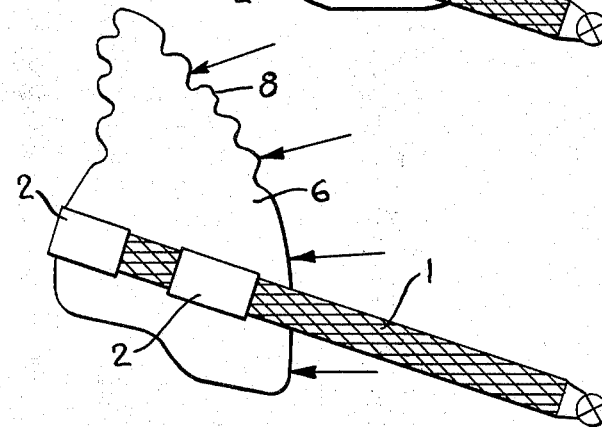
Figure 4A:
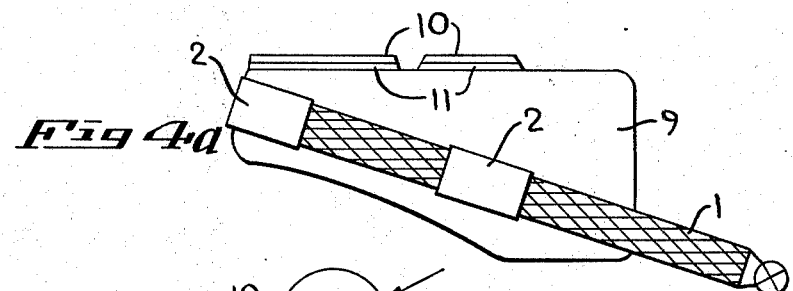
Figure 5:
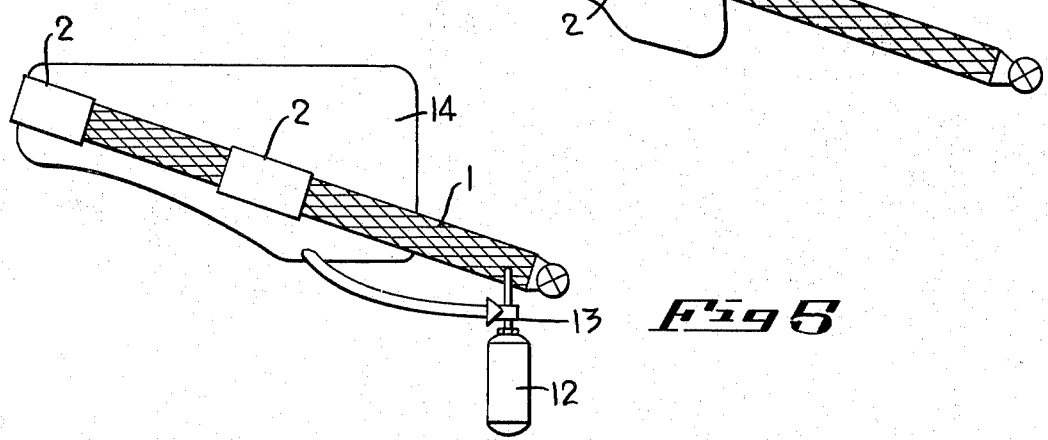
Figure 1:
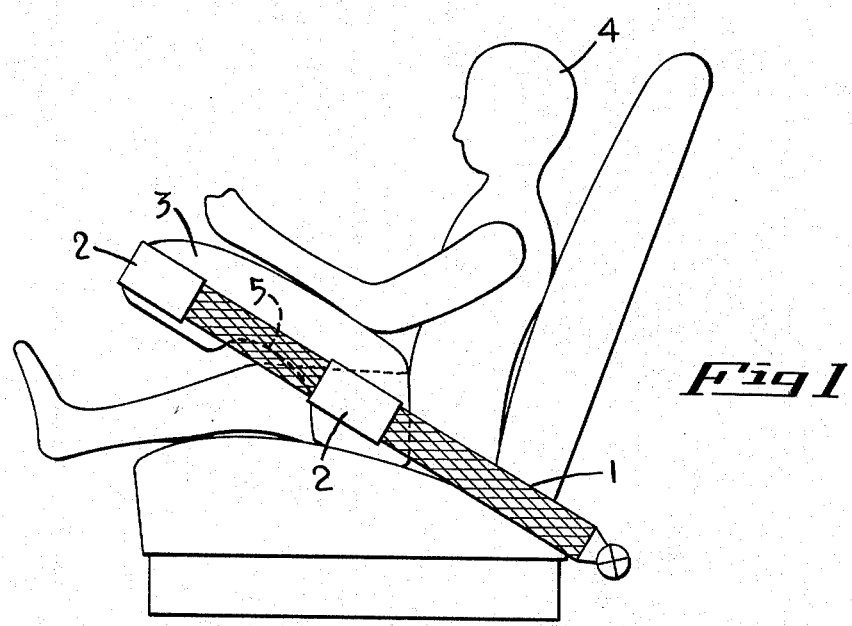
FIG. 1 shows a child in normal sitting position on a motor vehicle seat with a safety device designed according to the present invention.
Figure 2:
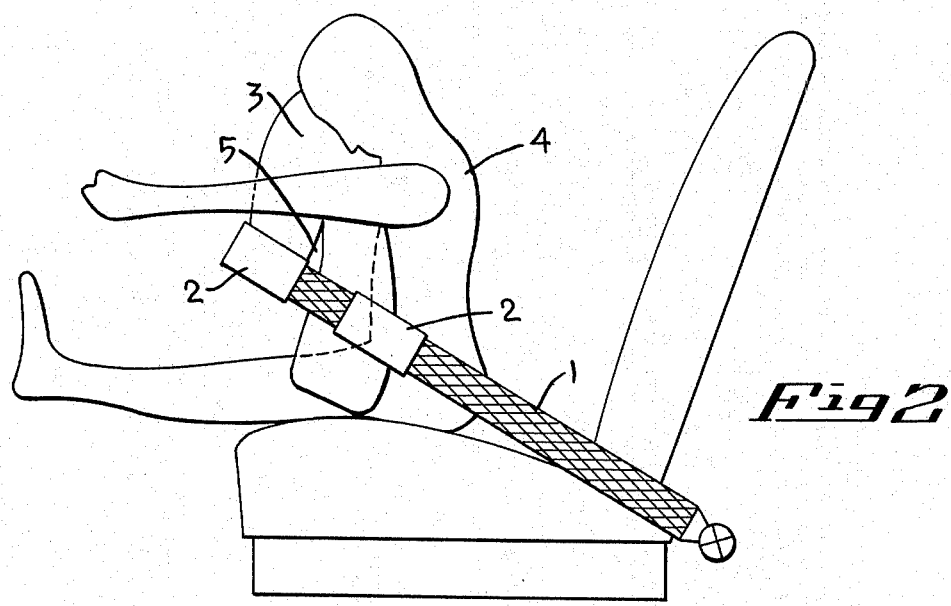
FIG. 2 shows the sitting position of the child according to FIG. 1 after great deceleration of the motor vehicle.

FIGS. 3a, b show a further embodiment of the safety device designed according to the present invention in same representation as given in FIGS. 1 and 2, however, without seat and child, namely in the initial position (FIG. 3a) and after a great deceleration of the motor vehicle (FIG. 3b);

FIGS. 4a, b, in same form of representation as in FIGS. 3a, b, shows a further embodiment of the safety device designed according to the present invention; and FIG. 5 shows still another embodiment of the present invention in initial position and in the same view as given in FIG. 3a.

As it can be seen from FIG. 1, the safety device designed according to the present invention consists of a retaining belt 1 serving as conventional pelvis — safety belt with belt loops 2 - corresponding parallel belt-guide-loops on the other side of the cushion can not be seen in FIG. 1 - and also consists of one or several air cushions 3. In normal sitting position air cushion 3, in the case of the embodiment of the present invention illustrated here, can be utilized as table for the purpose of reading or playing. The arm movements of the person in sitting position, here the child 4, are thus not restricted by the safety device designed according to the present invention.

In the case of an impact of the vehicle or in the case of some very great deceleration, the body of the child 4 exerts a pressure onto the air cushion, a pressure which — compare with FIG. 2 - in the embodiment of the safety device designed according to the present invention and illustrated in FIGS. 1, 2, causes the air cushion to fold out in upward direction. The cushion thus raises itself in front of the child 4, so that a support with a broad surface and extending from the hip up to the head is formed for the body of the child 4 which, as a result of the deceleration, has been pressed in forward direction. At a relatively low pressure per unit of surface area, the upper body is also held back and the whiplashing of the head is also avoided.

Figure 4B:
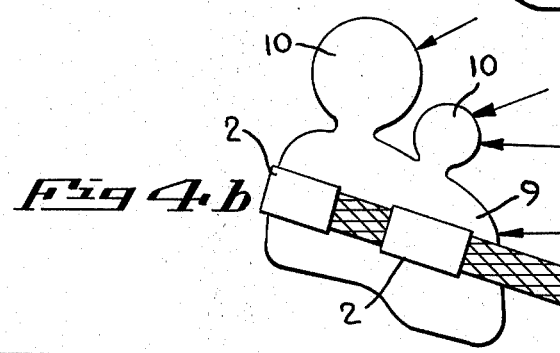

Furthermore, as FIGS. 4a, 4b show, it is possible to equip the air cushion 9 at its upperside with empty additional cushions 10 which are connected with the cushion 9 by means of a bursting diaphragm 11. Under the action of pressure, these bursting diaphragm tear and the additional cushions 10 are filled with air from the cushion 9, so that again an upright raising of the air cushions is created and therewith a support with a broad surface is created for the upper body and the head of the child.

A somewhat more expensive embodiment of the present invention is illustrated in FIG. 5. In this case the raising of the cushion is achieved by means of an inflation mechanism - which in similar manner to inflation devices in known life saving jackets which are carried along on airplanes - consist of a compressed-gas cylinder 12 with a valve 13 which, in turn, is released through the action of tensile forces on the retaining belt 1 and then leads to an inflation of the air cushion 14 and therewith to a volume enlargement of the same. In this embodiment of the present invention, a considerably greater volume enlargement can be achieved in comparison to the air cushions designed according to FIGS. 1 to 4 and a larger supporting area can be created therewith for the person to be protected.

In the case of the safety devices designed according to FIGS. 1 and 2, the folding-up of the air cushion 3 is achieved through the illustrated mounting of the guide loops 2 and the indentation 5 in the middle portion of the air cushion 3. It goes without saying that in the case of the safety device designed according to the present invention, the retaining belt 1 and in given cases also the air cushion 3 are appropriately designed in such a manner so that they absorb the energy on impact of the body, that is to say when the air cushion 3 is exposed to compressive stress and the retaining belt 1 to tensile stress.

In place of a buckling point provided in accordance with FIGS. 1 and 2, in the case of the embodiment of the present invention according to FIGS. 3a, b, the raising of the air cushion 6 is achieved through releasing seams 7 (FIG. 3a) which, when pressure is exerted onto the cushion, tear open and, accompanied by energy absorption, cause the cushion to straighten out upwardly in the direction toward the upper body and the head of the person to be protected. The increase in volume after an impact of the motor vehicle can be seen from FIG. 3b, in which the torn-open releasing seams are symbolized by the undular delimitation 8 of the cushion 6.

A further essential advantage of the safety device designed according to the present invention consists therein that it can be affixed with few manipulations onto the existing, standard anchoring points of standard safety belts. All known measures with respect to energy absorption can also find additional application in the case of the device designed according to the present invention; for example, the rear belt-guide-loop, which on impact on the retaining belt 1 slides in forward direction, can also be constructed in form of an energy consuming friction brake.

The material of the air cushion should be as little elastic as possible in all cases, so as to avoid back-catapulting effects or to reduce them at least to a minimum. Furthermore, the air cushions can be subdivided into chambers through partition walls, so that the air can not escape haphazardly. Also these partition walls can be provided with releasing seams, in order to attain energy absorption. The same can also be achieved through small flow cross-sections between the chambers.

We claim:

1. A safety device, for use in connection with a vehicular seat, especially for the protection of a young person such as a child or a youth, in the event of rapid deceleration of the vehicle, comprising in combination, a retaining safety belt having a looped front portion and being anchored in the vehicle to the rear of the person relative to the direction of vehicular movement, at least one deformable air bag disposed, in normal sitting position of the person, substantially at average hip height in front of the person, and belt loops arranged on said belt comprising a first belt loop connected to a portion of said air bag disposed away from the person during normal use and connected to said belt near the forwardmost part thereof; a second belt loop connected to a portion of said air bag disposed near the person during normal use and being slidably connected to said belt at a part normally disposed laterally adjacent said air bag during use; said belt loops cooperating with said belt to hold and to guide the air bag in such a manner that upon rapid deceleration of the vehicle the body of the person will exert further pressure on the air bag and thereby drive the portion of the air bag adjacent the person which is slidably connected to the belt towards the front portion of the belt, whereby the air bag will be deformed and be raised in front of the body of the person, for protecting the person.

2. A safety device, as claimed in claim 1, said air bag defining an upwardly directed indentation and being normally disposed in the normal sitting position of the person substantially horizontally said air bag being guided with relation by the retaining belt said retaining and said indentation cooperating in such a manner that, upon rapid deceleration of the vehicle, the air bag will be folded upwardly in front of the body of the sitting person.

3. A safety device, as claimed in claim 1, said air bag being provided at the upper side with breakable seams, arranged to break open upon the exertion of said forward pressure, whereupon the air bag will expand in an upward direction.

4. A safety device, as claimed in claim 1, said air bag having near the upper side at least one unfilled, folded cushion, and a breakable diaphragm normally separating the interior of the bag from the interior of the cushion, said diaphragm being so constructed as to burst after the application of said forward pressure on said air bag.

5. A safety device, as claimed in claim 1, said air bag being inflatable and upwardly expandable, and an inflation mechanism connected to said air bag, said inflation mechanism being actuatable through the action of tensile forces in the retaining belt occurring during rapid deceleration of the vehicle.

* * * * *